United States Patent
Kakinari et al.

(10) Patent No.: US 8,347,287 B2
(45) Date of Patent: Jan. 1, 2013

(54) SYSTEM AND METHOD FOR LOCALIZING A SERVER APPLICATION USING A CLIENT-SIDE TRANSLATOR

(75) Inventors: Takashi Kakinari, Fort Collins, CO (US); Caroline N. Koff, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1125 days.

(21) Appl. No.: 12/245,404

(22) Filed: Oct. 3, 2008

(65) Prior Publication Data

US 2010/0088695 A1   Apr. 8, 2010

(51) Int. Cl.
*G06F 9/445* (2006.01)
(52) U.S. Cl. .......................... 717/178; 717/137; 717/171
(58) Field of Classification Search .......... 717/171–178, 717/136–137
See application file for complete search history.

(56) References Cited

U.S. PATENT DOCUMENTS

| | | |
|---|---|---|
| 6,687,736 B1 | 2/2004 | Lee |
| 7,155,443 B2 | 12/2006 | Kung et al. |
| 2002/0162093 A1* | 10/2002 | Zhou et al. .................. 717/130 |
| 2002/0188722 A1* | 12/2002 | Banerjee et al. .............. 709/225 |
| 2003/0093465 A1* | 5/2003 | Banerjee et al. .............. 709/203 |
| 2009/0177733 A1* | 7/2009 | Talker .......................... 709/203 |

OTHER PUBLICATIONS

Sybase, "Administration and Performance Guide", 2003, Sybase Inc., Chapters 9-12, pp. 403-563.*
Sing Li, "Create internationalized JSP applications", 2005, IBM DeveloperWorks, 11 pages.*

* cited by examiner

*Primary Examiner* — Ted T Vo

(57) ABSTRACT

A method is provided for localizing a server application using a client-side translator. A client device selects a locale specific resource file using client locale information stored in a client operating system or provided by a user. The client locale information may be sent to a server. The client may download a locale specific resource file associated with the server application or install a locale specific resource file from a computer readable medium. The server application sends a displayable string to the client device. The displayable string may be a lookup key to mapping a locale specific string in the locale specific resource file to the displayable string. The displayable string may be replaced by the locale specific string corresponding to a translation of the displayable string. The locale specific string displays on the client device.

15 Claims, 4 Drawing Sheets

SYSTEM AND METHOD FOR LOCALIZING A SERVER APPLICATION USING A CLIENT-SIDE TRANSLATOR

BACKGROUND

Software internationalization is the process of generalizing software to present and process a variety of languages, character sets, and cultural customs. Internationalized software can be localized (i.e., translated) so users can understand and utilize software in their own language.

Localizing a distributed application can create some challenges. Many Java-based software solutions are distributed applications and adopt the form of client-server architecture. Typically, the client is a "thin client" such as a web browser or a graphical user interface (GUI) application running on a user's personal computer, which may be used to accept and display data. In contrast, servers may perform many complex operations such as accessing databases or file systems, and processing requests from multiple clients. When internationalizing applications using the client-server architecture, the server is enabled to service multiple clients, and the language environment on each client computing device may be different from the language environment of other clients. Since the servers and clients are not necessarily using identical or compatible language environments, localizing (i.e., translating) and displaying the strings in the client's GUI with applications originating from the server may be challenging.

Current approaches to internationalization involve the sending of "locale" information from clients to servers supporting distributed localizability. Locale can be a set of parameters that define a user's language, geographic territory, character set used to encode the language, or combination thereof. The client may communicate its locale with a request to the server, and then the server may process the request and generate a translated string that matches client's locale. In practice, the sharing of "locale" and localized strings between the clients and servers with distributed localizability capability is non-trivial to implement using current solutions.

DETAILED DESCRIPTION

Figure 1:
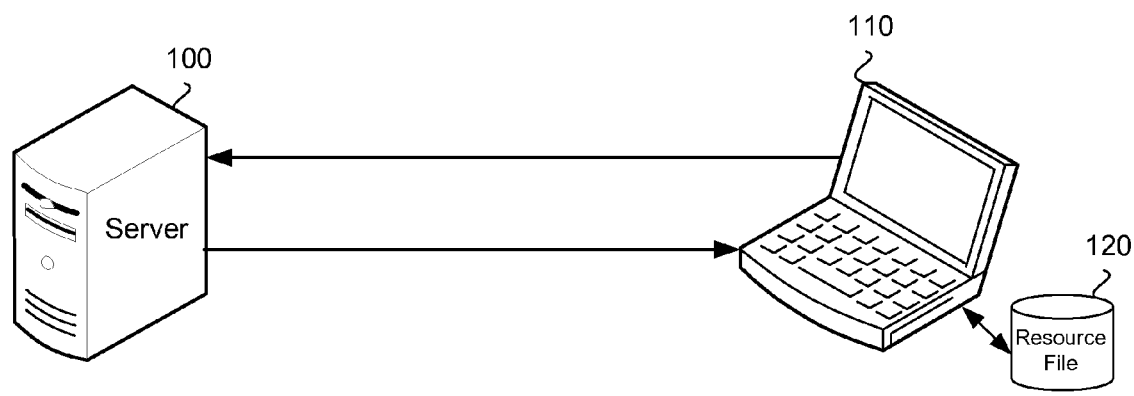
FIG. 1 is an illustration of a server and a client device with a resource file used for localizing a server application in accordance with an embodiment.

Alterations and further modifications of the inventive features illustrated herein, and additional applications of the principles of the inventions as illustrated herein, which would occur to one skilled in the relevant art and having possession of this disclosure, are to be considered within the scope of the invention. The same reference numerals in different drawings represent the same element.

Prior systems and methods for internationalization increase the complexity of developing server applications and burden an application server (content server) with localizing or translating hundreds or thousands of strings for each client. The process of localizing of strings on the server-side can reduce server performance, which may cause the server application to run slower for the client device.

The present system and method can internationalize and localize a server application using a client-side translation file, as illustrated in FIG. 1. A client device 110 may be located in a different geographical region or area from a server 100 enabled to run the server application, or the client device may use a different language or character set from the server enabled to run the server application. The client device may select a locale specific resource file 120 from the server containing translated strings (locale specific strings) of displayable strings in the server application. The selection of the locale specific resource file may be made by sending client locale information (e.g., the natural language used and running on the client device) stored in a client's operating system to the server enabled to run the server application. With the client locale information, the server may select the resource file corresponding to the client's locale and download the resource file onto the client device. After the locale specific resource file associated with the server application is downloaded onto the client device, the server application may execute and send a displayable string to the client device.

The displayable string sent to the client may be a string that can be displayed in a default or natural language, like American English, used by the software developers. The displayable string may also be a lookup key that maps the displayable string to the locale specific string in the locale specific resource file. The displayable string may be replaced with the locale specific string corresponding to a translation of the displayable string in the locale specific resource file located on the client device. Then the locale specific string may be displayed on a screen of the client device for an end user.

For example, the server application may supply English strings and the client device 110 needs to display Japanese messages. The client device sends the server 100 its client locale information, which indicates to the server that the client is using Japanese as a language. Next, the server sends an English-to-Japanese resource file (the locale specific resource file) 120 to the client device. After the locale specific resource file has been downloaded on the client device, the server may run the server application and then the server application can be localized on the client device. The server application may send an English string (the displayable string) to the client device. The English string from the server application is used as a lookup key to get the corresponding Japanese translation of the English string. Then the English string may be replaced with the corresponding Japanese string and displayed on the client device. The server application appears to a user to be running in Japanese on a client device.

A server application is computer software, firmware, hardware, or combination thereof that runs on a server 100 used across a network or the internet in a client-server architecture to provide several clients the functionality of the application on the client device 110. The hosting server(s) may provide the processing, database, and resources used by the application. The client device may be a personal computer, laptop computer, personal digital assistant (PDA), wireless device, mobile telephone, or similar device enabled to network with a server. The server may be enabled to service and host a plurality of clients or client devices. The client device may be considered a "thin client" because the bulk of the processing for the server application is performed by the server. The client may make a request of the server using the server application. The server may process the request and return a result. A server application may work with client that is a graphical user interface (GUI) application, web browser, or web client that uses limited processing functionality in running the application, but which is enabled to send requests to the server and receive responses from the server.

In past approaches, the server has performed the translation of language specific strings for the server application into the client's language on the server side because the server performs most of the processing in a client-server model and architecture. Having all the translation of the language specific strings performed by the server demands significantly more processing resources which can increase the burden on the server and reduce server performance. Server-side translation may also cause the application on the client device to run slower, as the server may take longer to process and translate the client's requests.

For example, a client using a server application without internationalization may make a request of the server. The server processes the request and sends a response back to the client.

In an example of a past approach of a client using a server application with internationalization and server-side translation, the client may make the same request of the server. The server processes the request, and then the response is sent to a translator or translation module within the server system. The translator translates the response, and sends the translated response back to the server module responsible for communicating with clients. Finally, the translated response is sent from the server back to the client.

In addition to adding time and resources for processing the translation, the server may need to track and store the locale information on each of the clients running the server application, which may be hundreds or thousands of clients. The client may send the locale or language information once to the server so the server is required to store and append the locale or language information to every request made or every response processed before the localized string is produced. Alternatively, the client may include the locale or language information with each request to the server which may increase the size of each request. Storing and/or appending the locale or language information can increase the complexity of a localized server-side translated server application.

Another alternative approach to server-side translation used in the past has been to create or compile a separate server application or program for each language or locale using the server application. Having separate applications, code bases, or programs for each language has also been problematic because each application is developed, tested, and maintained individually and separately adding a huge cost to application development and maintenance.

The present system and method can reduce the complexity and cost to localizing server applications by removing the localization burden from the server. The server application may be created using an application documentation language (a host language or a server language) native to the developers or a standardized language used in software development, like American English. The application documentation language or server locale refers to the natural language spoken or written in the locale where the software is developed, like English. The application documentation language in this context does not refer to a programming language or code used to develop the server application, like Java. The application may use strings, wording, or phrases that are specific to a particular language or locale. The strings embedded in the server application specific to a natural language may be called a displayable string. The translated strings corresponding to the displayable strings for a particular natural language or character set of a specific locale may be called a locale specific string. The displayable strings are in the server application while the locale specific strings may be in a separate resource file or database. The strings of the server application may be encoded in United States-American Standard Code for Information Interchange (US-ASCII). These displayable strings may be used in a specified function call or application programming interface (API) or a series of function calls or APIs that indicates the string is to be translated for localization. The string may contain deliminators that can be used as place holders for arguments used in the string. Java, Java-based software, or software with similar features may be used to develop, create, or implement client interfaces and server applications.

A method for localizing a server application using a client-side translator may include generating a plurality of displayable strings in the server application. The software developer or programmer may use the function calls or APIs when language specific strings are being used. The API functions may access the original string literal for the displayable string. A string literal may be the representation of a string value within the source code of a computer program or application. The displayable string may be used by the server in the client-server architecture to communicate and interface with the client, meaning the displayable string is being sent through the network or Internet instead of the localized string.

In another embodiment, the server application may use a printable string, graphic, audio segment, or video clip specific to a particular language, cultural custom, or locale that is translated or recasted in the language, cultural customs, or locale of the client device. The printable string, graphic file, audio file, or video file used by the server application may be labeled in the server application with a label that is a link to the printable string, graphic file, audio file, or video file. The method and system may allow displays, print, graphics, audio, and video to be translated by the client device.

Next, the displayable strings may be extracted from the server application for use in creating a locale specific resource file. An extraction tool may be used to analyze the server side source code to extract all the displayable strings and generate a corresponding resource file. Parsing the server application for the function calls or APIs used in generating displayable strings will allow software developers to provide language translators with the displayable strings of the host language or locale associated with the server application. An API may be used to extract the displayable strings from the server application.

The human translators can take the listing of displayable strings extracted from the server application and create a locale specific resource file for each language or locale that may use the server application. A resource file may be a file, database, table, or similar mechanism that can link a displayable string with a locale specific string (or an application label with a locale specific label). The displayable string or original string literal may be linked or mapped to a corresponding translated string (a locale specific string) in a locale specific resource file. The displayable string or original string literal may be used as the lookup key for the corresponding translated or locale specific string. Using the displayable string as a lookup key eliminates cryptic representations and identifiers in the server application and resource files. The locale specific resource file may have a locale specific string for at least one displayable string. A separate and distinct resource file may be created for each language or locale used by the server application.

In another embodiment, a resource file may be created for each class or package of the client applet with a plurality of languages and locales included in each class or package resource file. In another configuration, a resource file may be created for each class or package with each language and locale having a separate class or package resource file or locale specific class/package resource. In a further embodiment, a single resource file may be created containing translations for multiple languages and locales used by the server application. The locale information located in the client's operating system and the displayable string may be used in combination to obtain the corresponding translation or locale specific string.

The listing of displayable strings extracted from the server application allows translators that may be unfamiliar with the server application code to create translations without being conversant with the software code. In addition, the listing can be given to a plurality of translators each with their own language or locale specialty, so the translators can create their translations in parallel or simultaneous with each other. Creating different locale specific resource files at the same time can accelerate the development process of localizing the server application.

After the locale specific resource file has been created, the client may send client locale information from the client device 110 to the server 100. The client locale information may be stored on the operating system (OS) of the client device. The OS or user may supply or send the server the client locale information. Client locale information, specific locale, specific locale strings, and locale specific resource file may refer to a particular language, geographic territory or location, character sets, cultural customs, idioms, jargon, dialect, phonology, grammar, or vocabulary that is understandable to the user or used by the user of the client device.

In response to the client locale information sent by the client device, the server or the client device can download the locale specific resource file associated with server application onto the client device based on the client locale information. The application may be downloaded from the server using a Local Area Network (LAN), Wide Area Network (WAN), Internet, or other network used to connect a server to a client device.

For example, the client locale information may be associated with the country of Australia and the English language, so the server downloads onto the client device an Australian English resource file, in contrast to a British English, an American English, or a Torres Strait Creole (an Australian language) resource file.

The server application may install a client interface application or applet onto the client device, so the client device is enabled to interface with the server application. The client interface application may be installed when the locale specific resource file is being downloaded, or the client interface application and the locale specific resource file may be installed separately.

In an embodiment where graphic files, audio files, or video files are used, the translated or locale specific graphics, audios, or videos may be downloaded or installed with the locale specific resource file, or the locale specific graphics, audios, or videos may be included with the displayable strings in the locale specific resource file.

In another embodiment, a locale specific resource file can be selected using client locale information stored in a client operating system or by a user of the client device. The locale specific resource files associated with the server application may be installed onto a client device from a computer readable medium or other similar mechanism (e.g., installed using a compact disc (CD)).

With the locale specific resource file downloaded, installed, or loaded on the client device, the server application may run so the server application is localized by the client device. The server application on the server may send a displayable string to the client device. The displayable string may not be in a language understood by the user of the client device. The server application may use hundreds of strings organized and assembled to create a single display on a monitor or viewing device for a user. Graphics, audio, and video may also be used in the display or interface with the user of the client device.

The server application or the client interface application running on the client may replace the displayable string with the locale specific string corresponding to a translation of the displayable string. Then, the client device may display the locale specific string, so the strings in the server application are displayed in the language used by the client device and understood by the user of the client device. An API may be used to lookup the locale specific string in the locale specific resource file and to replace the displayable string with the locale specific string.

When a locale specific string corresponding to the displayable string is missing from the locale specific resource file, the displayable string may be substituted or replaced by itself (the displayable string). In other words, no substitution is made, so the displayable string may be displayed along with other translated strings in the same display. This embodiment may also be helpful to discover strings that have not been localized or translated yet. Similarly, no substitution may be made when the locale specific resource file is missing from the client device. A missing locale specific resource file may be the default scenario when the server application and client device use the same locale (a client device not requiring a localized or internationalized server application).

Figure 3:
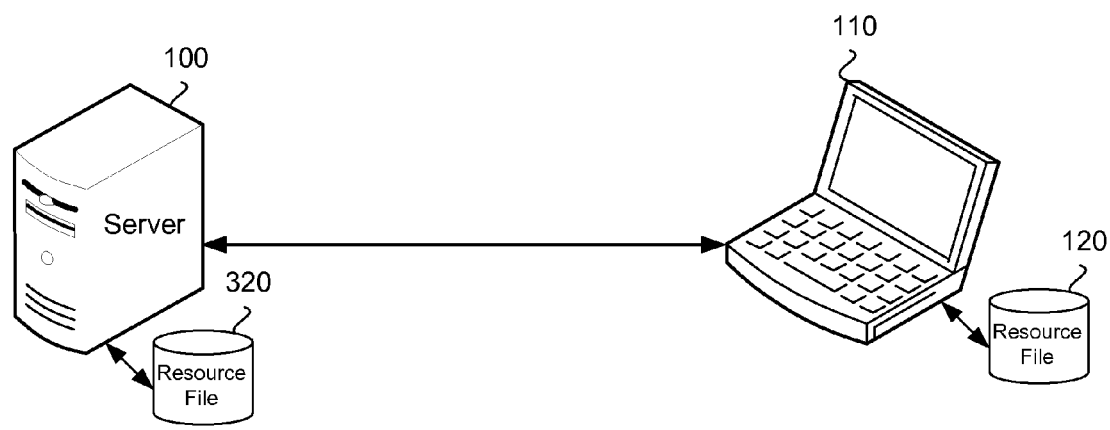
FIG. 3 is an illustration of a server with a resource file and a client device with a resource file used for localizing a server application in accordance with an embodiment.

In another embodiment as shown in FIG. 3, when the locale specific string corresponding to the displayable string is missing from the locale specific resource file 120 on the client device 110, the client device may access the locale specific resource file 320 on the server 100 by sending the displayable string to the server. The server may send or return the locale specific string corresponding to the displayable string to the client device, which may be used to replace the displayable string with the locale specific string. The server (content server) may be accessed to obtain the locale specific string on the locale specific resource file, or a separate translation server (not shown) may be accessed to reduce the traffic and processing performed by the content server running the server application.

Figure 4:
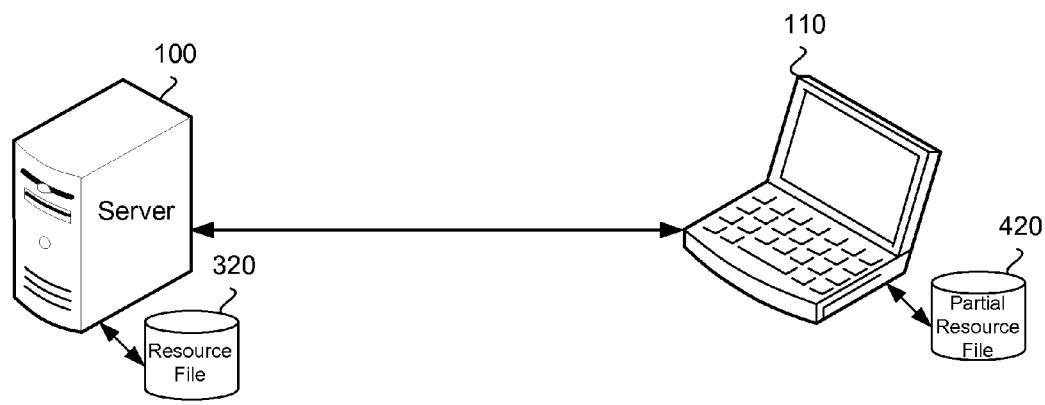
FIG. 4 is an illustration of a server with a resource file and a client device with a partial resource file used for localizing a server application in accordance with an embodiment.

In a further embodiment as shown in FIG. 4, when a part of the locale specific resource file 420 is missing from the client device 110, the client device may access the locale specific resource file 320 on the server 100 by sending the displayable string to the server. The server may send the locale specific string corresponding to the displayable string to the client device, which may be used to replace the displayable string with the locale specific string. The server (content server) may be accessed to obtain the locale specific string on the locale specific resource file, or a separate translation server (not shown) may be accessed to reduce the traffic and processing performed by the content server running the server application.

In another configuration, a plurality of locale specific resource files for the server application may be installed on a client device. A locale or language key and the displayable string key may be used in combination to select the file and the locale specific string corresponding to the displayable string for the particular or specific locale of the client device. The locale or language key may be taken from the locale specific information stored on the client OS. In still another embodiment, the user may select a locale to be used with the server application that is not set in the client OS.

In a further configuration for localizing a server application using a client-side translator, a locale resource file with a plurality of locales associated with the server application may be installed on a client device. The locale specific string may be on the locale resource file. The server application may send a displayable string from the server application to the client device. The client device may select a specific locale from the plurality of locales within the locale resource file using client locale information stored in a client operating system. A locale or language key and the displayable string key may be used in combination to select the locale specific string corresponding to the displayable string within the locale resource file for the particular or specific locale of the client device. The displayable string may be replaced with a locale specific string corresponding to the displayable string. Then, the locale specific string may be displayed the on the client device.

Figure 5:
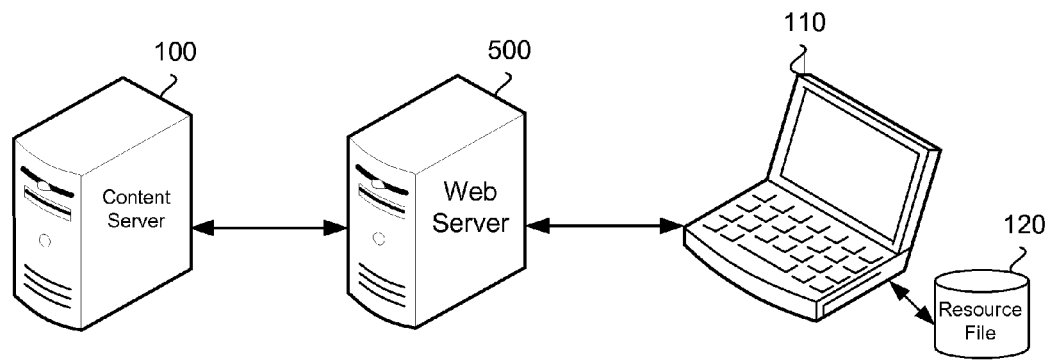
FIG. 5 is an illustration of a content server, a web server, and a client device with a resource file used for localizing a server application in accordance with an embodiment.

The system for localizing a server application using a client-side translator may include a server application with a plurality of displayable strings, a locale specific resource file with a locale specific string corresponding to at least one displayable string, a content server (server), and a client device. A web server 500 may connect the content server 100 to client devices 110 and may be used to handle communication between the content server and client devices, as shown in FIG. 5.

Some of the results of the system and method described are that the performance of the server is increased, the scope of quality assurance and testing is reduced, translations or locale specific resource files are easier to add, and development time and effort is reduced. Performance may improve because the locale information is reduced across the network to a single call to download the locale specific resource file or locale information is eliminated by installing the locale specific resource file from a computer readable medium directly connected to or inserted into the client device. The server's internationalization burden is reduced because the client may process the translation. Since the server and server application are "locale independent" (or locale-neutral), the software testing can be reduced because the complex logic used to manage and process the translations on a server can be minimized or eliminated. When translations are added or released as additional resource files, the set of binaries that make up the server application may not have to change or be released to the server, thus reducing the number of releases. The productivity of code developers may improve in the creation of the server application because the developers may not have to create or maintain cryptic keys or translation files as part of server application source code.

The method and system for localizing a server application using a client-side translator may be implemented using a computer readable medium having executable code embodied on the medium. The computer readable program code may be configured to provide the functions described in the method. The computer readable medium may be a RAM, ROM, EPROM, floppy disc, flash drive, optical drive, magnetic hard drive, or other medium for storing electronic data.

Figure 2:
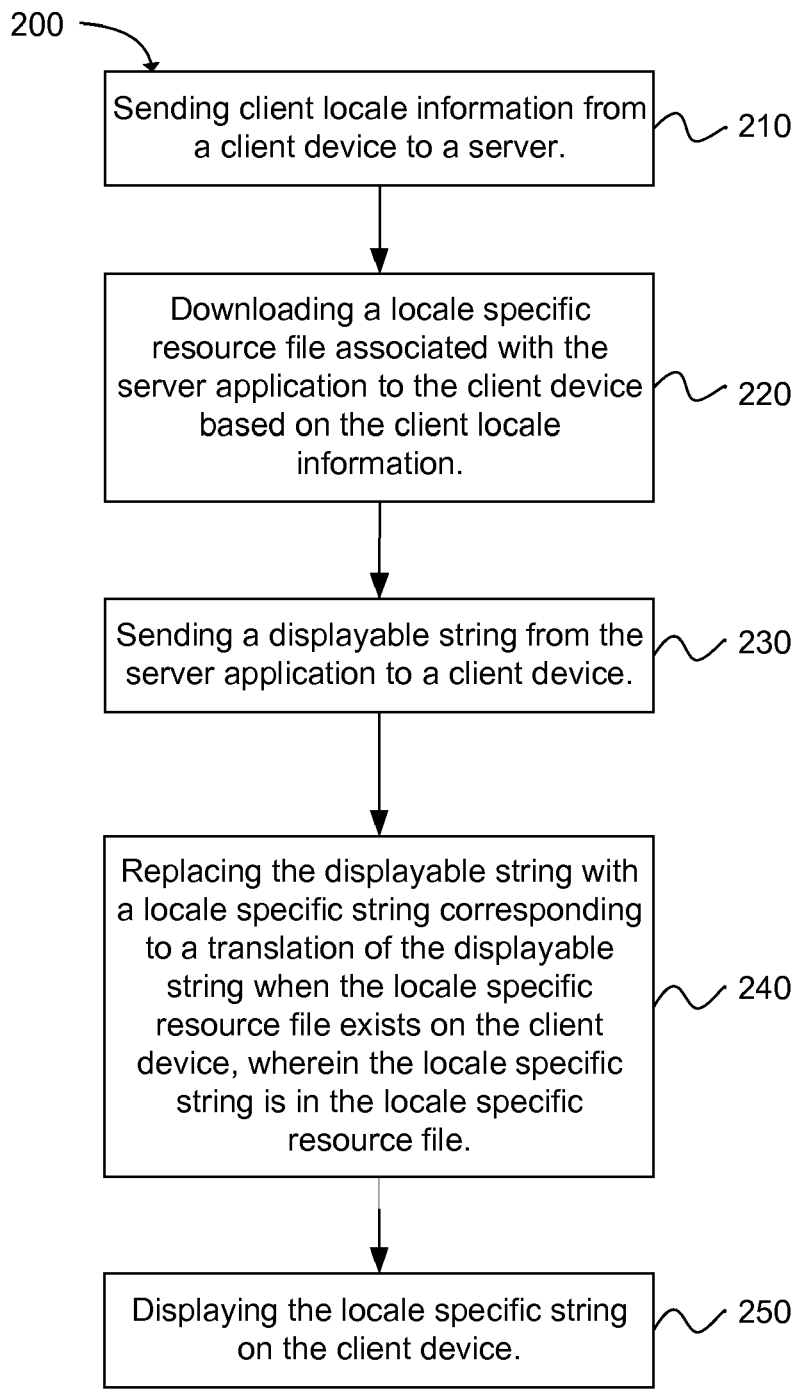
FIG. 2 is a flow chart illustrating a method for localizing a server application using a client-side translator in accordance with an embodiment.

Another embodiment provides a method 200 for localizing a server application using a client-side translator, as shown in the flow chart in FIG. 2. The method includes the operation of sending 210 client locale information from a client device to a server. The operation of downloading 220 a locale specific resource file associated with the server application to the client device based on the client locale information follows. The next operation of the method may be sending 230 a displayable string from the server application to the client device.

The method 200 further includes replacing 240 replacing the displayable string with a locale specific string corresponding to a translation of the displayable string when the locale specific resource file exists on the client device. The locale specific string is on the locale specific resource file. After substituting the displayable string with a locale specific string, the operation of displaying 250 the locale specific string on the client device can be performed.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for localizing a server application using a client-side translator, comprising:
    sending client locale information from a client device to a server;
    receiving, from the server at the client device, a first locale specific resource file associated with the server application and the client locale information;
    receiving, on the client device, a displayable string from the server application;
    determining, on the client device, whether the first locale specific resource file includes a locale specific string corresponding to a translation of the displayable string;
    replacing the displayable string with the locale specific string corresponding to the translation of the displayable string when the first locale specific resource file includes the locale specific string corresponding to the translation of the displayable string;
    accessing a second locale specific resource file on the server using the displayable string when the first locale specific resource file does not exist on the client device;
    obtaining the locale specific string corresponding to the translation of the displayable string from the second locale specific resource file when the first locale specific resource file does not exist on the client device; and
    displaying the locale specific string on the client device.

2. The method of claim 1, further comprising mapping the locale specific string in the first locale specific resource file using the displayable string as a lookup key prior to replacing the displayable string with the locale specific string.

3. The method of claim 2, wherein the displayable string is a string literal.

4. The method of claim 1, wherein the client locale information includes a language used by the client device.

5. The method of claim 1, wherein the client locale information contains a geographic location of the client device.

6. The method of claim 1, wherein the first locale specific resource file includes at least one locale specific string using a language, character sets, and cultural customs of a specific locale.

7. The method of claim 1, further comprising:
upon determining that the first locale specific resource file does not include a locale specific string corresponding to a translation of the displayable string:
accessing the second locale specific resource file on the server using the displayable string; and
obtaining the locale specific string corresponding to the translation of the displayable string from the second locale specific resource file.

8. The method of claim 1, wherein an application programming interface (API) is used to replace the displayable string with the locale specific string.

9. The method of claim 1, wherein replacing the displayable string with the locale specific string uses the displayable string as the locale specific string when the displayable string does not have a corresponding locale specific string in the first locale specific resource file of the client device.

10. An article comprising at least one computer readable storage medium storing instructions that upon execution cause a system to:
send client locale information from a client device to a server;
install a first locale specific resource file associated with a server application on the server onto the client device;
receive, on the client device, a displayable string from the server application on the server;
determine, on the client device, whether the first locale specific resource file includes a locale specific string corresponding to a translation of the displayable string;
replace the displayable string with the locale specific string corresponding to the translation of the displayable string when the first locale specific resource file includes the locale specific string corresponding to the translation of the displayable string;
access a second locale specific resource file on the server using the displayable string when the first locale specific resource file does not exist on the client device;
obtain the locale specific string corresponding to the translation of the displayable string from the second locale specific resource file when the first locale specific resource file does not exist on the client device; and
display the locale specific string on the client device.

11. The method of claim 10, wherein generating the plurality of displayable strings in the server application is implemented with an application programming interface (API).

12. A client device for localizing a server application using a client-side translator, comprising:
a locale specific resource file; and
a processor to:
receive the locale specific resource file from a content server,
receive a displayable string from a server application on the content server,
determine whether the locale specific resource file includes a locale specific string corresponding to a translation of the displayable string,
replace the displayable string with the locale specific string when the locale specific resource file includes the locale specific string corresponding to the translation of the displayable string,
access a second locale specific resource file on the server using the displayable string when the first locale specific resource file does not exist on the client device,
obtain the locale specific string corresponding to the translation of the displayable string from the second locale specific resource file when the first locale specific resource file does not exist on the client device, and
display the locale specific string.

13. The client device of claim 12, wherein the client device uses a web client to run the server application.

14. The client device of claim 12, wherein a web server connects the content server to the client device.

15. The system of claim 12, wherein the server application uses Java-based software.

* * * * *

UNITED STATES PATENT AND TRADEMARK OFFICE
CERTIFICATE OF CORRECTION

PATENT NO. : 8,347,287 B2
APPLICATION NO. : 12/245404
DATED : January 1, 2013
INVENTOR(S) : Takashi Kakinari et al.

It is certified that error appears in the above-identified patent and that said Letters Patent is hereby corrected as shown below:

In the Claims

In column 10, line 4, in Claim 11, delete "method" and insert -- article --, therefor.

In column 10, line 35, in Claim 15, delete "system" and insert -- client device --, therefor.

Signed and Sealed this
Fourteenth Day of May, 2013

Teresa Stanek Rea
*Acting Director of the United States Patent and Trademark Office*